(12) United States Patent
Nyamwange (10) Patent No.: US 12,204,988 B2
(45) Date of Patent: Jan. 21, 2025

(54) QUANTUM COMPUTING WITH HYBRID MEMORY CUBE FOR DATA CENTERS

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 455 days.

(21) Appl. No.: 17/532,573

(22) Filed: Nov. 22, 2021

(65) Prior Publication Data

US 2023/0162072 A1    May 25, 2023

(51) Int. Cl.
*G06N 10/00* (2022.01)
*G06F 8/41* (2018.01)

(52) U.S. Cl.
CPC .............. *G06N 10/00* (2019.01); *G06F 8/427* (2013.01); *G06F 8/436* (2013.01)

(58) Field of Classification Search
CPC .......... G06F 1/26; G06F 30/27; G06F 9/4494; G06F 8/34; G06F 8/41; G06F 8/433; G06F 9/4881; G06F 16/182; G06F 16/24537; G06F 16/24544; G06F 16/2455; G06F 16/24552; G06F 16/2456; G06F 16/2462; G06F 16/2471; G06F 16/27; G06F 16/278; G06F 8/456; G06F 9/5066; G06F 8/447; G06F 9/3877; G06F 16/22; G06F 9/30101; G06F 16/9024; G06F 3/0482; G06F 9/5044; G06F 9/5055; G06F 9/30; G06F 9/30196; G06F 15/16; G06F 2209/506; G06F 9/30043; G06F 9/382; G06F 9/44505; G06F 9/44521; G06F 9/4843; G06F 9/5038; G06F 9/355; G06F 13/36; G06F 3/048; G06F 3/0486; G06F 30/20; G06F 8/10; G06F 8/43; G06F 9/44; G06F 9/448; G06F 9/4482; G06F 9/46; G06F 9/465; G06F 9/466; G06F 2111/02; G06F 2111/08; G06F 30/25; G06F 30/32; G06F 9/45508; G06F 1/022; G06F 1/0342; G06F 11/1438; G06F 11/1446; G06F 11/2094; G06F 11/2097; G06F 2201/84; G06F 8/35; G06F 8/443; G06F 8/451; G06F 9/22; G06F 9/223; G06F 9/3017; G06F 9/4862; G06F 9/5027; G06F 9/52; G06F 11/0793; G06F 11/14; G06F 16/25; G06F 16/358; G06F 16/367; G06F 40/232; G06F 40/253; G06F 40/279; G06F 40/295; G06F 40/30; G06F 8/427; G06F 8/436; G06F 8/51;

(Continued)

(56) References Cited

U.S. PATENT DOCUMENTS

8,185,481 B2    5/2012 Long et al.
9,076,549 B2    7/2015 Kim et al.
(Continued)

*Primary Examiner* — Binh C Tat
(74) *Attorney, Agent, or Firm* — Banner & Witcoff, Ltd.

(57) ABSTRACT

A quantum computing device configured to receive code written using one or more of a plurality of programming languages and convert the received code into quantum assembly language that can be executed by one or more quantum processing units of the quantum computing device. The quantum computing device also includes a hybrid memory cube storage device configured to function as storage for the high data throughput rates associated with the quantum processing units.

18 Claims, 5 Drawing Sheets

(58) Field of Classification Search
CPC .. G06F 9/30007; G06F 9/3013; G06F 9/3016; G06F 9/3802; G06F 9/3818; G06F 9/3858; G06F 9/3861; G06F 9/451; G06F 30/027; G06F 16/217; G06F 16/248; G06F 16/9035; G06F 16/906; G06F 21/44; G06F 21/6245; G06F 18/2178; G06F 18/21; G06F 18/25; G06F 12/0831; G06F 16/2308; G06F 16/2315; G06F 16/254; G06F 16/283; G06F 16/284; G06F 18/214; G06F 21/6218; G06F 2221/2141; G06F 2221/2149; G06F 21/10; G06F 21/64; G06F 2221/2109; G06F 8/36; G06F 12/0811; G06F 12/0862; G06F 12/0864; G06F 12/1027; G06F 13/287; G06F 15/17381; G06F 15/17387; G06F 15/76; G06F 15/8069; G06F 16/24562; G06F 2212/1016; G06F 2212/602; G06F 2212/6022; G06F 2212/6024; G06F 2212/6032; G06F 40/00; G06F 9/06; G06F 9/3004; G06F 9/30047; G06F 9/3885; G06F 13/16; G06F 16/00; G06F 16/951; G06F 18/213; G06F 18/23; G06F 40/20; G06N 10/00; G06N 20/00; G06N 10/60; G06N 10/40; G06N 10/70; G06N 10/20; G06N 10/80; G06N 3/08; G06N 3/04; G06N 5/043; G06N 3/088; G06N 3/084; G06N 3/09; G06N 3/006; G06N 7/01; G06N 3/044; G06N 3/047; G06N 5/022; G06N 20/10; G06N 5/04; G06N 3/0455; G06N 3/126; G06N 5/01; G06N 3/045; G06N 3/049; G06N 20/20; G06N 3/12; G06N 3/0442; G06N 3/0464; G06N 3/0475; G06N 5/046; G06N 3/02; G06N 5/02; G06N 3/042; G06N 3/043; G06N 3/048; G06N 3/0495; G06N 3/086; G06N 3/0895; G06N 3/091; G06N 3/092; G06N 5/025; G06N 5/045; G06N 3/082; G06N 3/0499; G06N 3/06; G06N 99/007

USPC .................................................. 716/100–108
See application file for complete search history.

(56) References Cited

U.S. PATENT DOCUMENTS

| | | |
|---|---|---|
| 9,257,169 B2 | 2/2016 | Jung et al. |
| 9,335,951 B2 | 5/2016 | Son et al. |
| 9,348,539 B1 | 5/2016 | Saxena et al. |
| 9,466,351 B2 | 10/2016 | Jeong |
| 10,120,607 B2 | 11/2018 | Gnomirello |
| 10,275,176 B1 | 4/2019 | Gold et al. |
| 10,310,760 B1 | 6/2019 | Dreier et al. |
| 10,346,047 B2 | 7/2019 | Ignomirello |
| 10,678,436 B1 | 6/2020 | Jiang et al. |
| 10,838,833 B1 | 11/2020 | Jibaja et al. |
| 10,853,148 B1 | 12/2020 | Kenney et al. |
| 10,871,922 B2 | 12/2020 | East |
| 10,936,238 B2 | 3/2021 | Power et al. |
| 10,976,962 B2 | 4/2021 | Karumbunathan et al. |
| 10,985,139 B2 | 4/2021 | Yu et al. |
| 11,068,389 B2 | 7/2021 | Gao et al. |
| 11,074,961 B2 | 7/2021 | Kasibhatla et al. |
| 11,113,232 B2 | 9/2021 | Joshi et al. |
| 2016/0034371 A1 | 2/2016 | Oh et al. |
| 2016/0163377 A1 | 6/2016 | Oh et al. |
| 2017/0200512 A1 | 7/2017 | Lee |
| 2018/0096085 A1 | 4/2018 | Rubin |
| 2018/0356989 A1 | 12/2018 | Meister et al. |
| 2019/0042970 A1* | 2/2019 | Zou ..................... G06F 9/30101 |
| 2019/0121889 A1 | 4/2019 | Gold et al. |
| 2019/0340136 A1 | 11/2019 | Irwin et al. |
| 2020/0081648 A1 | 3/2020 | Bernat et al. |
| 2021/0104292 A1 | 4/2021 | Kim et al. |
| 2021/0182724 A1* | 6/2021 | Zou ......................... G06N 10/00 |
| 2021/0182725 A1* | 6/2021 | Zou ..................... G06F 1/0342 |
| 2021/0225426 A1 | 7/2021 | Moon et al. |
| 2021/0311819 A1 | 10/2021 | Lee et al. |
| 2021/0313001 A1 | 10/2021 | Jang et al. |
| 2021/0326279 A1 | 10/2021 | Yeung et al. |
| 2021/0334413 A1 | 10/2021 | Kwak et al. |
| 2021/0334414 A1 | 10/2021 | Kwak et al. |
| 2021/0335413 A1 | 10/2021 | Kasibhatla et al. |

* cited by examiner

FIG. 1

Hybrid Memory 200

| Data Location 202 | Data Type 204 | QPU Output 206 | Architecture 208 | Service level 210 |
|---|---|---|---|---|

FIG. 2

Quantum State Engine 300

| QPU State 302 | Quantum Memory 304 | Quantum Process 306 | Quantum Process 308 | Quantum Process 310 |
|---|---|---|---|---|

QUANTUM COMPUTING WITH HYBRID MEMORY CUBE FOR DATA CENTERS

TECHNICAL FIELD

Aspects of this disclosure generally relate to processing and storage of large volumes of data at high speed using quantum computing hardware and associated methodologies. The systems and methods described herein may be deployed within a data center environment, among others.

BACKGROUND

An ever-increasing amount of data is being generated by technologies used in daily life. The volume of data is outpacing improvements in processing ability using conventional processing hardware. No device exists that offers an efficient way of processing computational tasks at a much higher rate/with much greater efficiency than conventional transistor-based computational hardware.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure includes a quantum computing device that has a computation translation engine. The computation translation engine may have a quantum compiler processor that is configured to receive a code block from an application quantum environment, identify a language of the code block is one of a plurality of programming linkages, and compile the code block to form a compiled data set. The computation translation engine may also include a syntax processor that is configured to receive the compiled data set, and generate a parsed data structure from the compiled data set. The computation translation engine may also have a quantum translator engine that is configured to analyze the parsed data structure, and convert the parsed data structure into a quantum assembly language structure. Further, the quantum computing device may include a quantum computation engine that is configured to process the quantum assembly language structure and output a processed response to an application interface.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
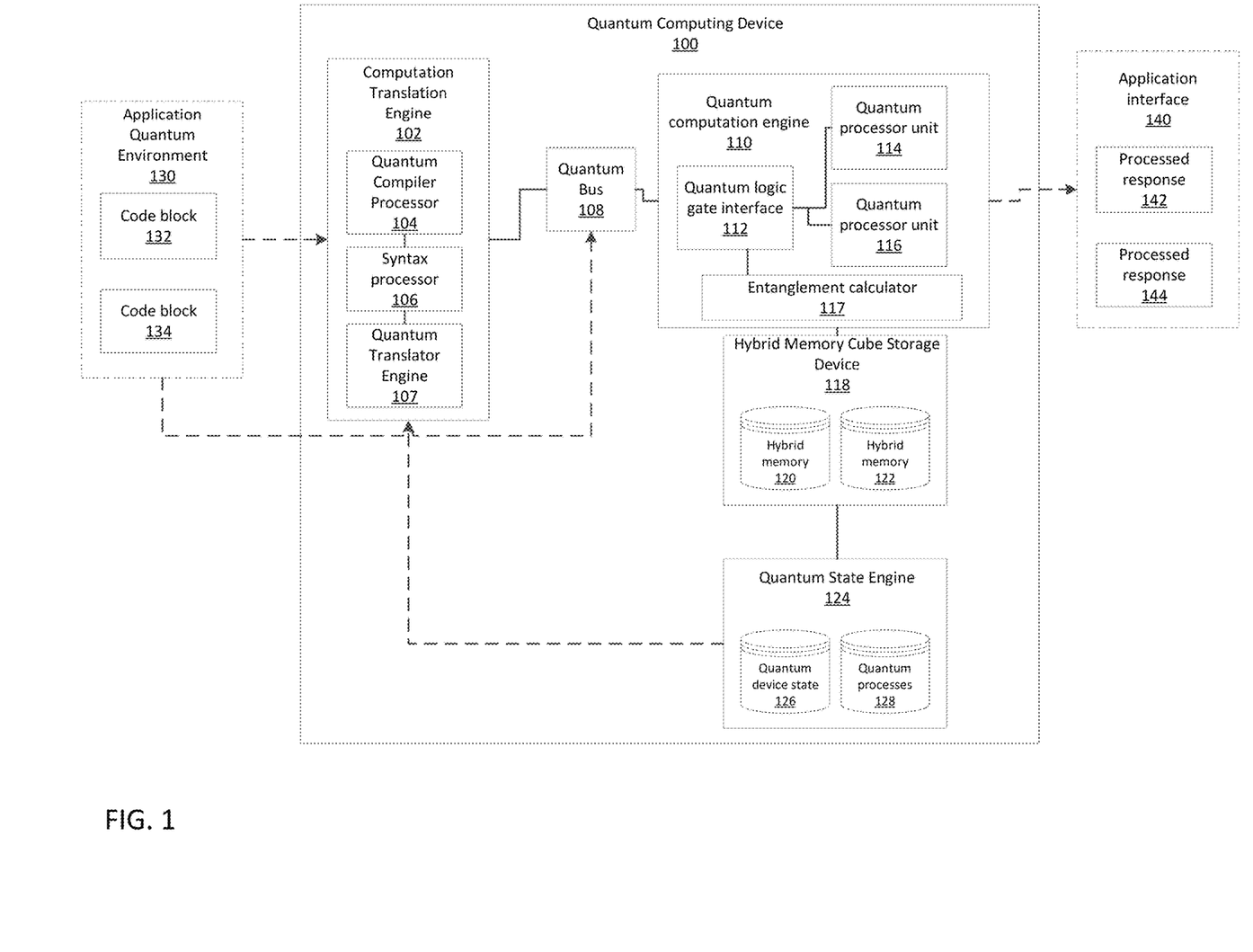
FIG. 1 schematically depicts a quantum computing device, according to one or more aspects described herein.

FIG. 1 schematically depicts a quantum computing device 100, according to one or more aspects described herein. Advantageously, the quantum computing device 100 may be configured to receive and interpret code written in one or more of a plurality of programming languages, and execute processes and functions of the received code using one or more quantum processor units (e.g., quantum processor units 114 and 116). This may facilitate very high processing throughput compared to conventional computational systems that use transistor-based processors/microprocessors. Further, the high processing throughput of the quantum computing device 100 may result in very large volumes of data output. Advantageously, the quantum computing device 100 includes a novel storage configuration that uses a hybrid memory cube storage device 118 to store and provide access to stored data at very high data transmission rates. The hybrid memory cube storage device 118 is described in further detail in the proceeding disclosure. The systems and methods described herein may be deployed in data centers, among other environments.

The quantum computing device 100 may receive a code block from an application quantum environment 130. The application quantum environment 130 may include an interface configured to receive code written in one or more of a plurality of programming languages. Code blocks 132 and 134 are two elements that may be representative of hundreds, thousands, or millions of different portions of one or more programs/processes to be processed using the quantum computing device 100. Further, the interface of the application quantum environment 130 may include a software user interface and/or firmware that facilitates operative communication between the quantum computing device 100 and conventional computational hardware, firmware and/or software. The application quantum environment 130 may be an interface hosted by a consolidated system of the quantum computing device 100, or may be separately hosted using separate hardware, firmware and/or software. The application quantum environment 130 may additionally include APIs configured to link the quantum computing device 100 to external entities to facilitate transmission of code blocks 132 and 134. In certain examples, the code blocks 132 and 134 may be written using object-oriented, procedural, functional, scripting, and/or logic programming languages, among others. It is understood that those of ordinary skill in the art will recognize different examples of each of the different types of programming languages, without departing from the scope of these disclosures. Accordingly, processes described in the code blocks 132 and 134 may be configured to be executed using conventional computational firmware and/or hardware that utilize conventional processor types (e.g., transistor-based central processing units, graphical processing units, application-specific integrated circuits, field programmable gate arrays etc.) that utilize binary digit operations (bits). In addition, one or more of the code blocks 132 and 134 may be configured to execute processes directly using one or more quantum bits (qubits) of a quantum processor units, such as quantum processor units 114 and/or 116.

The quantum computing device 100 includes a computation translation engine 102. This computation translation engine 102 further includes a quantum compiler processor 104. In one example, the quantum compiler processor 104 may be configured to receive one or more of the code blocks 132 and 134 from the application quantum environment 130. In addition, the quantum compiler processor 104 may be configured to identify a language of the code block as one of a plurality of programming languages that the computation translation engine 102 is configured to interpret and process. Further, in response to identifying the programming language of the received code block, the quantum compiler processor 104 may be configured to compile the code block to form a compiled data set. Those of ordinary skill in the art will recognize various compiler processes that may be utilized to compile the code written in various different programming languages, and which may be utilized by the quantum compiler processor 104. Accordingly, the quantum compiler processor 104 may include or access datasets of one or more programming language keywords, syntax and the like.

The computation translation engine 102 further includes a syntax processor 106. This syntax processor 106 may be configured to receive the compiled data set from the quantum compiler processor 104, and to generate a parsed data structure from the compiled data set. In one example, the syntax processor 106 may break down the received compiled data set into a token tree that is passed to a quantum translator engine 107. Further, the syntax processor 106 may execute one or more processes to analyze the compiled data set for semantic errors and compatible operations that may be executed using the quantum computation engine 110.

The quantum translator engine 107 may be configured execute one or more processes to receive a parsed data structure from the syntax processor 106, and to analyze the parsed data structure for suitability for further processing using the quantum computation engine 110. Specifically, the quantum translator engine 107 may execute one or more processes to convert the parsed data structure into a quantum assembly language structure. The quantum translator engine 107 may execute one or more processes to identify elements of the parsed data structure that may be mapped into a quantum assembly language. Accordingly, the quantum translator engine 107 may receive information on the quantum processes utilized by the quantum computation engine 110 from a quantum state engine 124.

The quantum assembly language structure outputted from the quantum translator engine 107 may be passed to quantum bus 108. It is contemplated that the quantum bus 108 may be configured with the hardware, firmware, and/or software configured to facilitate communication of data to the quantum computation engine 110. In one specific example, the quantum bus 108 may provide a data link between the computation translation engine 102 and a quantum logic gate interface 112 of the quantum computation engine 110. Accordingly, the quantum logic gate interface 112 may be configured with the hardware, firmware, and software configured to execute one or more processes on one or more quantum processing units, such as quantum processing units 114 and 116. Those of ordinary skill in the art will recognize that additional quantum processing units beyond those units 114 and 116 may be utilized to provide additional qubits, hence additional computational processing ability and speed to the quantum competition engine 110.

In order to facilitate a high data throughput through the quantum computation engine 110, the quantum computing device 100 may utilize a hybrid memory cube storage device 118. This hybrid memory cube storage device 118 may be in operative communication with the quantum computation engine 110. It is contemplated that any hybrid memory cube structure may be utilized, and any memory capacity, without departing from the scope of these disclosures. In one example, the hybrid memory cube storage device 118 is schematically depicted as having hybrid memory elements 120 and 122. These hybrid memory elements 120 and 122 may each combine multiple dies of memory cell arrays on top of one another to form high-bandwidth memory implementations using random access memory elements.

The quantum state engine 124 of the quantum computing device 100 may be configured to store information on quantum processes or algorithms executed by the quantum computation engine 110, and state information associated with the quantum processor units 114 and 116 (qubits) among others. Accordingly, the quantum state engine 124 may include a database of quantum device state 126 that stores information on the quantum state of the quantum processor units 114 and 116 for use in processing and error correction. Additionally, the quantum state engine 124 may include a database of quantum processes or 128, which may store information on quantum processes/algorithms used by the quantum translator engine 107 and the quantum computation engine 110 to execute functionality associated with the code blocks 132 and 134 received at the application quantum environment 130.

The output of the quantum computation engine 110 may be communicated to an application interface 140. This application interface may be configured with various hardware, firmware, and/or software elements configured to communicate a processed response back to a user, such as exemplary processed responses 142 and 144.

In certain examples, the quantum computation engine 110 includes a sequence of quantum bits (qubit), such as quantum processor units 114 and 116. The term "quantum bit" or "qubit" as used herein, may refer to a quantum version of a binary digit (bit) in classical computing. The qubit is the basic unit of quantum information. Whereas a classical bit may be in one of two states, "0" and "1", a quantum bit may be in a linear combination of two orthogonal states denoted as "|0>" and "|1>." In general, a qubit leverages properties/features of quantum mechanics in a form of a two-state quantum-mechanical system. A qubit may be implemented in a variety of forms, such as, for example, polarizations of a photon, discrete energy levels of an ion, spin states of an electron, among others. For example, a spin of an electron may have two states of spin up or spin down. Additionally, a polarization of a single photon may lead to two states of vertical polarization or horizontal polarization. While classical bits may either be 'on' ('1') or 'off' ('0'), quantum mechanics allows qubits to have a coherent superposition of both states simultaneously, which is fundamental to quantum mechanics and to quantum computing. This superposition allows qubits to hold additional information to the binary two states of '0' and '1'. In one example, 40 qubits may be encoded to represent approximately a trillion calculations. Accordingly, the quantum competition engine 110 may be configured with quantum processor units, such as quantum processor units 114 and 116, to allow the quantum computation engine 110 to process data one or several orders of magnitude faster than conventional processing elements of similar size and energy consumption. One or more of the quantum processor units (e.g., units 114 and 116) of the quantum competition engine 110 may be dedicated to error correction associated with the computations executed by the remaining quantum processor units.

In one example, the quantum translator engine 107 may execute one or more quantum computing processes to convert digital information into quantum computing information, e.g., quantum bits (qubits), which can be processed by the quantum computation engine 110.

In one example, quantum processes, such as processes 128, executed by the quantum competition engine 110 may utilize a comparison between two qubit formatted data elements. The entanglement calculator 117 may calculate an entanglement score based on a comparison between qubit data of the quantum processing units 114 and 116. The entanglement score may be representative of "sameness" between the data of two examined processing units 140 and 116. For example, if an entanglement score is high, then the corresponding probability that the compared data show similar features is greater. If an entanglement score is low, the corresponding probability that compared data show similar features is lesser. In some cases, the entanglement calculator 117 may aid in quantum error correction on the quantum processor units 114 and 116. The quantum error correction may be used to protect the converted quantum information from errors due to decoherence and other quantum noise that may be introduced into the data of the quantum computation engine 110. Quantum error correction may be used to achieve a fault-tolerant quantum comparison that overcomes noise on stored quantum information, but with other errors that may be introduced due to erroneous quantum conversion techniques. Error correcting codes that may be used include, but are not limited to, bit flip code, sign flip code, Shor code, bosonic codes and/or other codes or models.

Figure 2:
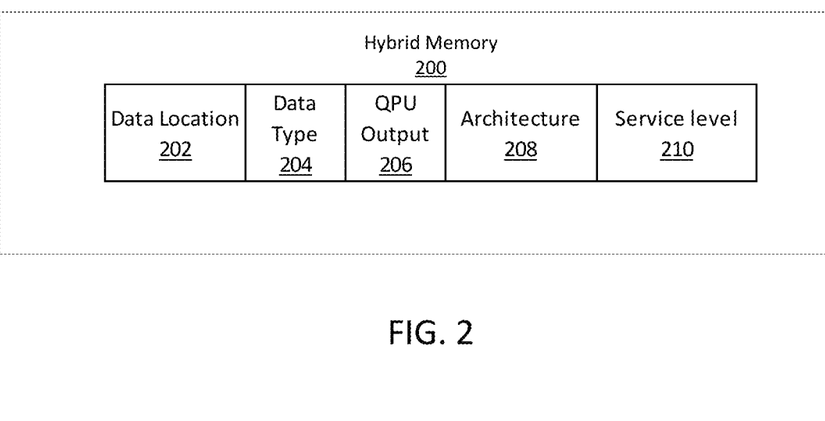
FIG. 2 schematically depicts a structure of a hybrid memory, according to one or more aspects described herein.

FIG. 2 schematically depicts a structure of a hybrid memory 200, according to one or more aspects described herein. In one example, the hybrid memory 200 may be similar to hybrid memory 120 and 122. It is contemplated that the data stored in hybrid memory 200 may utilize any data structure type or combination of data structures. In one example, the hybrid memory 200 includes a data location 202. This data location 202 may contain information about where data received from the quantum computation engine 110 is stored. Further, the data location 202 may include file names and addresses within one or more co-located and/or cloud-based databases. The hybrid memory 200 may additionally include a data type 204. This data type 204 may categorize data based upon the type of data outputted from the quantum computation engine 110. Accordingly, the data type 204 may identify the data as image, text, or tabular data, among others. The QPU (Quantum Processing Unit) output 206 may store the raw quantum values associated with the output data. Architecture 208 may store information on the quantum computation engine 110 hardware used to execute the quantum processing. Service level 210 may be used to store a priority level associated with the data stored in the hybrid memory 200.

Figure 3:
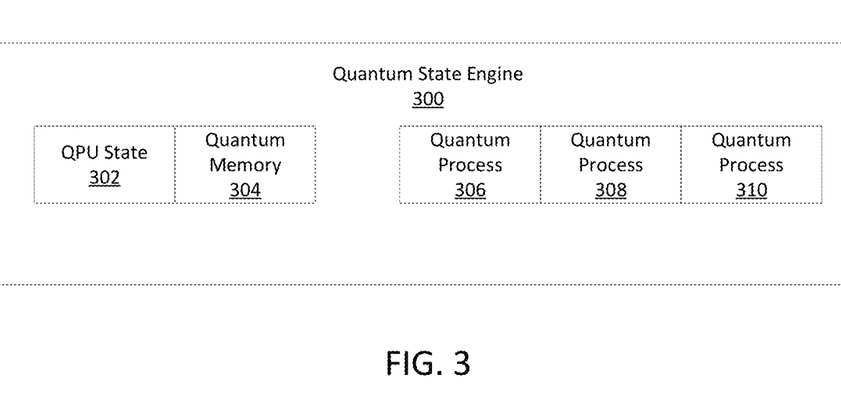
FIG. 3 schematically depicts a structure of a quantum state engine, according to one or more aspects described herein.

FIG. 3 schematically depicts a structure of a quantum state engine 300, according to one or more aspects described herein. The quantum state engine 300 may be similar to quantum state engine 124, as discussed in relation to FIG. 1. It is contemplated that quantum state engine 300 may utilize any data structure type, or combination of data structures to store information associated with the quantum computation engine 110. In one example, the quantum state engine 300 includes a QPU state 302. This data element 302 may store a quantum state of one or more of the quantum processor units 114 and 116. Further, quantum memory 304 may temporarily store information associated with the functionality of the quantum competition engine 110, such as a source of data received by the quantum competition engine 110.

In addition, the quantum state engine 300 may store quantum processes and/or algorithms executed by the quantum computation engine 110. Processes 306, 308, and 310 are three exemplary processes, but those of ordinary skill in the art will recognize that the quantum state engine 300 may store fewer than or many more than the depicted processes 306-310.

Figure 4:
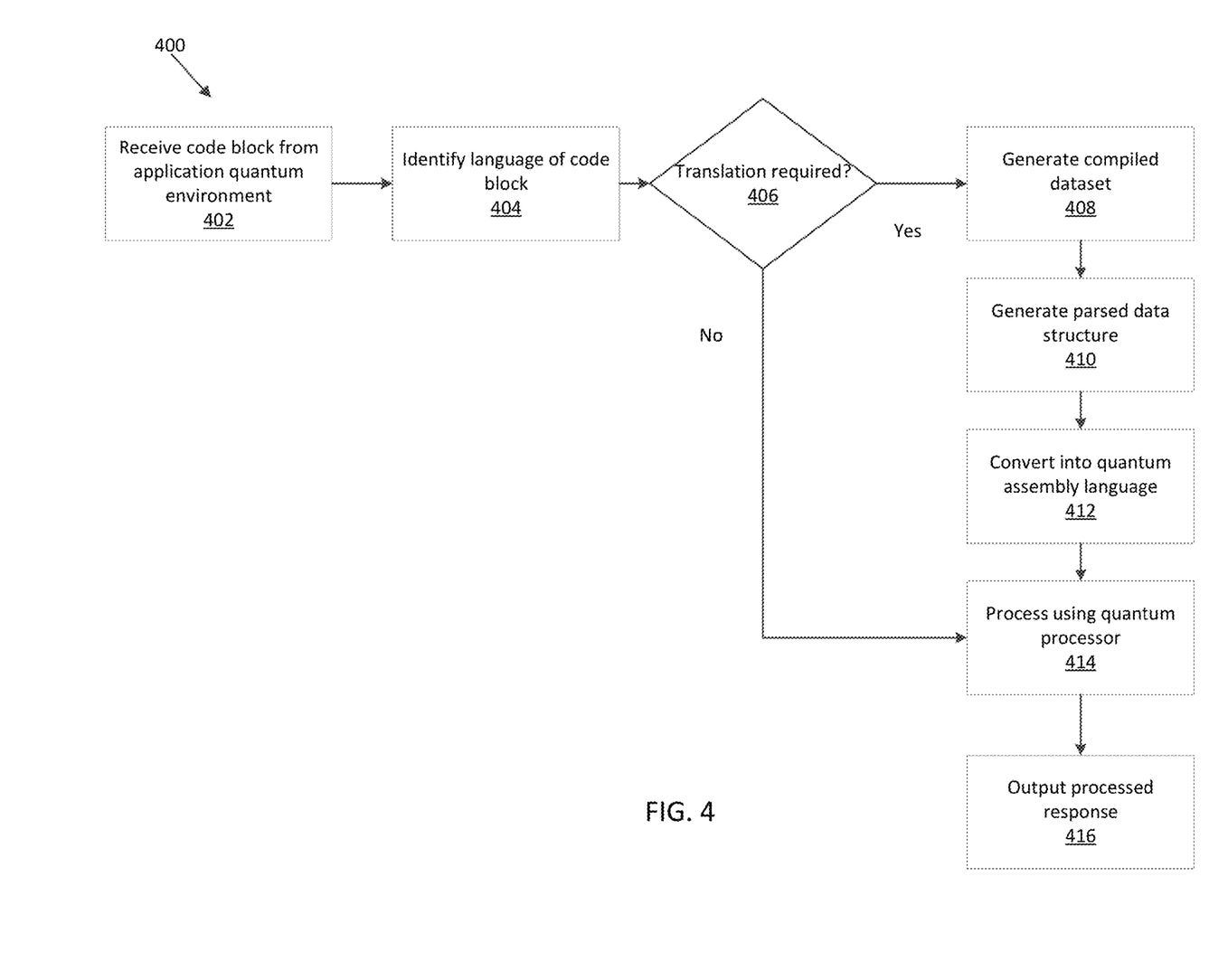
FIG. 4 is a flowchart diagram of a process for source-agnostic processing of code using a quantum computation engine, according to one or more aspects described herein.

FIG. 4 is a flowchart diagram 400 of a process for source-agnostic processing of code using a quantum computation engine, according to one or more aspects described herein. Accordingly, the flowchart diagram 400 may be executed by the quantum computing device 100. In one example, one or more processes may be executed at block 402 to receive a code block from an application quantum environment. The received code block may be similar to code block 132 and/or 134. The one or more processes of block 402 may be executed by the computation translation engine 102.

One or more processes may be executed at block 404 to identify a language of a code block. In one example, these one or more processes may be executed by the quantum compiler processor 104. Subsequently, the computation translation engine 102 may execute one or more processes to determine whether translation is required for the received code blocks. These one or more processes to determine whether translation is required may be executed at decision block 406. If translation is required, flowchart 400 may proceed to block 408 and a compiled dataset may be generated. The one or more processes associated with block 408 may be executed by the quantum compiler processor 104. A parsed data structure may be generated at block 410. One or more processes to generate the parsed data structure may be executed by the syntax processor 106. Subsequently the parsed data structure may be converted into a quantum assembly language at block 412. These processes of block 412 may be executed by the quantum translator engine 107. The quantum assembly language may be processed at block 414 using a quantum processor. In one example, the quantum processor associated with block 414 may be one or more of the quantum processor units 114 and 116 of the quantum computation engine 110. Further, the process response may be outputted at block 416. These one or more processes of block 460 may be executed by the quantum computation engine 110 and outputted to an application interface such as application interface 140.

Figure 5:
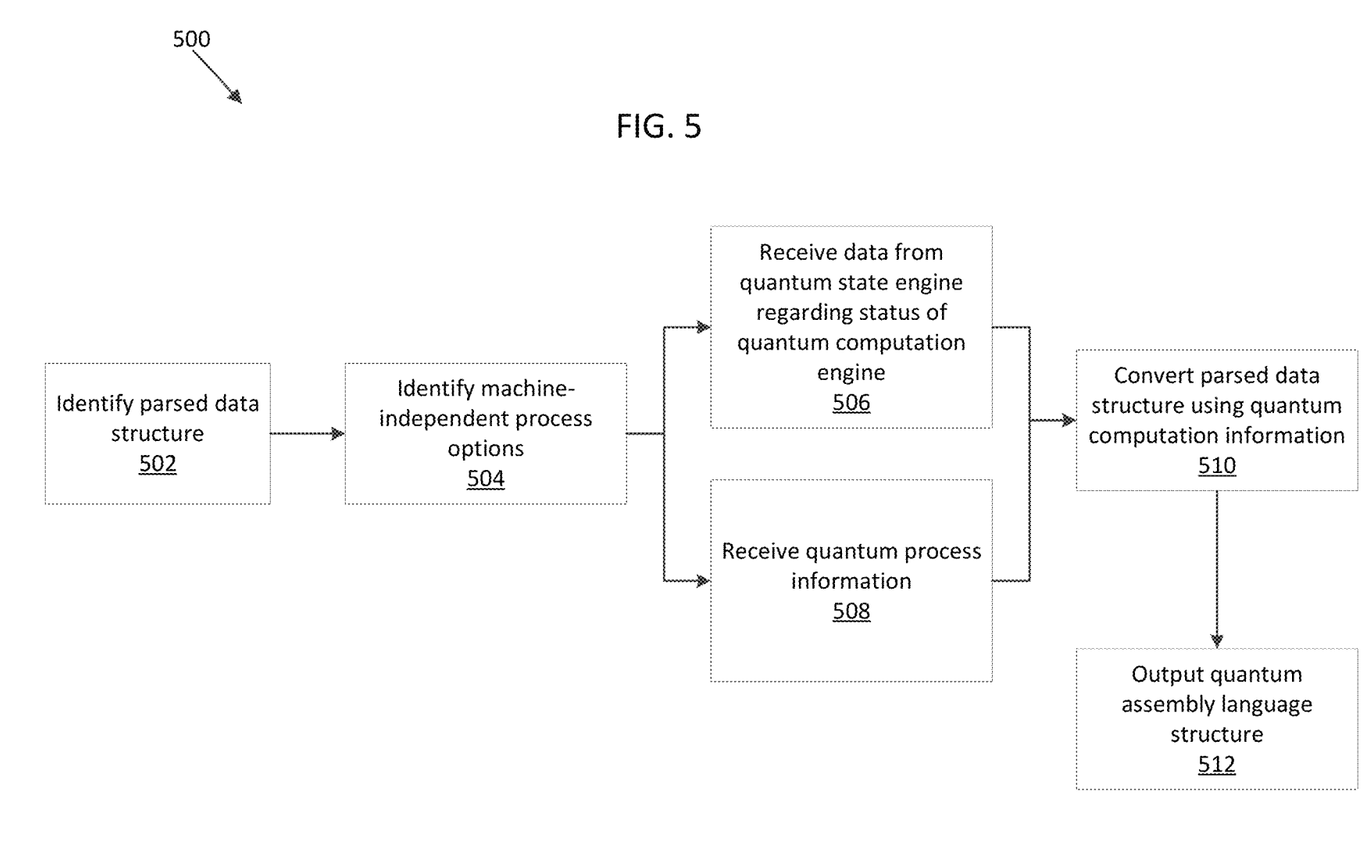
FIG. 5 is a flowchart diagram of a process for generating a quantum assembly language structure, according to one or more aspects described herein.

FIG. 5 is a flowchart diagram 500 of a process for generating a quantum assembly language structure, according to one or more aspects described herein. In certain examples, the various processes of the flowchart 500 may be executed by the quantum translator engine 107. In one example, one or more processes may be executed at block 502 to identify a parsed data structure. This parsed data structure may be generated by the syntax processor 106. In certain examples, one or more processes may be executed to identify machine-independent process options at block 504. Additionally flowchart 500 may include the receipt of data from a quantum state engine regarding a status of a quantum computation engine. These processes may be executed at block 506, and the received data may be received from the quantum state engine 124. Additionally or alternatively, quantum process information may be received at block 508, and may be received from the quantum state engine 124. This received information at block 506 and/or block 508 may be utilized by the quantum translator engine 107 to convert the parsed data structure. This conversion of the parsed data structure into a quantum assembly language structure may be executed at block 510. Further, the quantum translator engine 107 may output the quantum assembly language structure at block 512, which may be outputted to the quantum bus 108.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
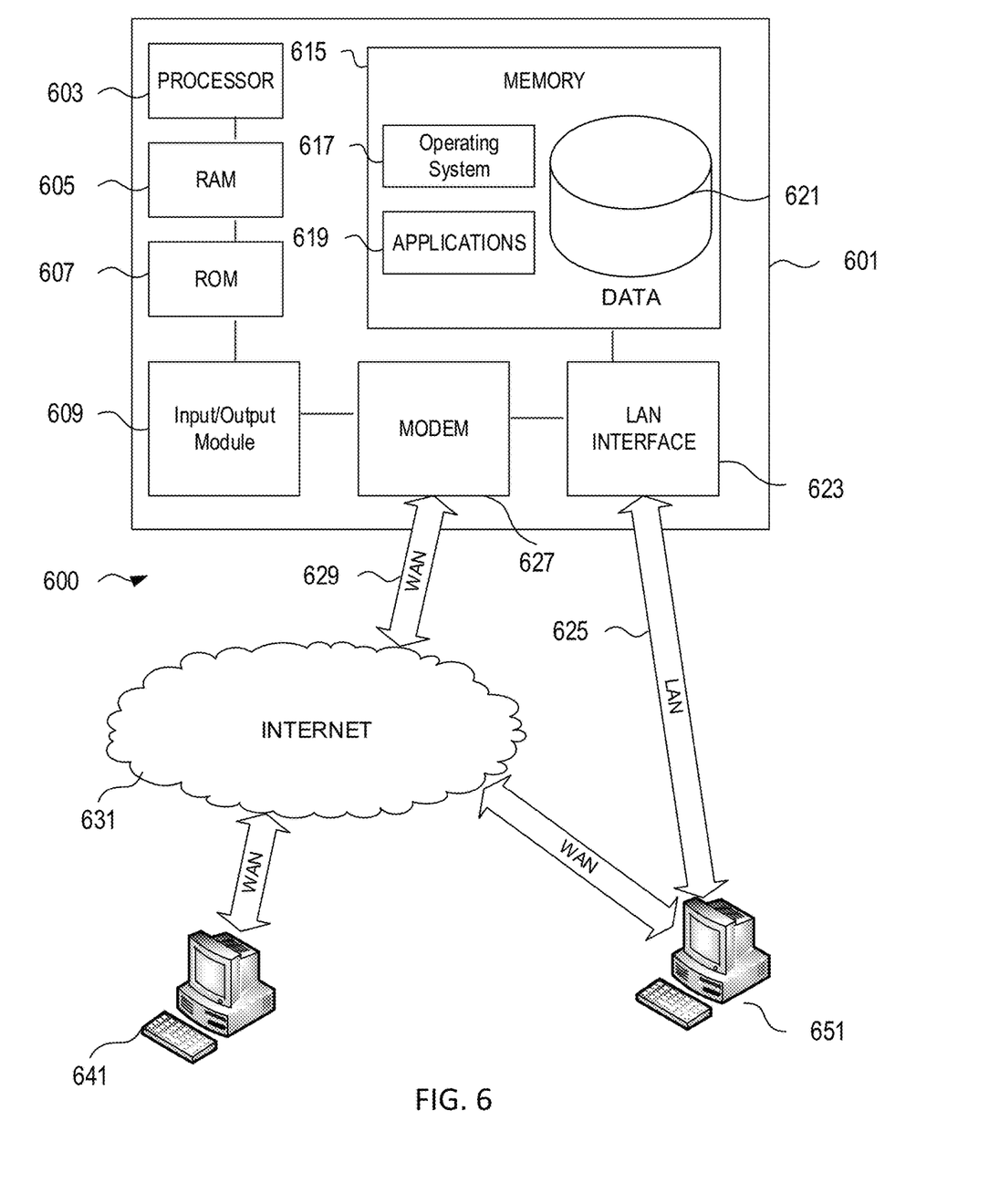
FIG. 6 shows an illustrative operating environment in which various aspects of the disclosure may be implemented, according to one or more aspects described herein.

As such, the machine learning training device 102, or one or more of the modules of the device 102 may be implemented as one or more network-linked computer devices, such as device 601 from FIG. 6. Thus, the quantum computing device 100 may be partially or wholly implemented on consolidated computing hardware, such as computing device 601, at a single geographic location, and/or on a single integrated circuit, and the like. In another example, the machine learning training device 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Specifically, the computing device 641 may represent one or more elements of the remote environment 120 and computing device 651 may represent one or more elements of the destination environment 140. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (Web-DAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to the machine learning training device 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the quantum computing device 100 may be able to process data received in a plurality of different formats described using one or a combination of a plurality of different programming languages. In addition, the quantum computing device 100 may be configured to carry out computational tasks on the received data using quantum processing units (e.g. units 114 and/or 116), that allow for very high processing rates that far exceed processing rates of conventional processors that use logic based on classic binary digits. In one example, the quantum computing device 100 may have a data processing throughput that is one or several orders of magnitude higher than conventional transistor-based processing can achieve for a similar energy input. Advantageously, the quantum computing device 100 may be used to reduce the carbon footprint associated with large data processing and storage operations in the fields of machine learning, video and audio processing, among many others, which may utilize data center resources.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a quantum computing device that includes a computation translation engine. The computation translation engine may have a quantum compiler processor that is configured to receive a code block from an application quantum environment, identify a language of the code block is one of a plurality of programming linkages, and compile the code block to form a compiled data set. The computation translation engine may also include a syntax processor that is configured to receive the compiled data set, and generate a parsed data structure from the compiled data set. The computation translation engine may also have a quantum translator engine that is configured to analyze the parsed data structure, and convert the parsed data structure into a quantum assembly language structure. Further, the quantum computing device may include a quantum computation engine that is configured to process the quantum assembly language structure and output a processed response to an application interface.

The quantum computing device may also include a hybrid memory cube storage device in operative communication with the quantum computation engine.

The quantum computing device may also include a quantum bus data link between the quantum translator engine and the quantum computation engine.

In one example, the code block may be a first code block in the quantum compiler processor to receive a second code block that bypasses the syntax processor and the quantum translator engine and is received at the quantum bus data link.

The parsed data structure may include a syntax tree data structure.

The syntax processor may be further configured to analyze the compiled data set for semantic errors and compatible operations that may be executed by the quantum computation engine.

The quantum computation engine may further include a quantum logic gate interface, configured to receive the quantum assembly language structure, and a quantum processing unit.

The quantum computing device may also include a quantum state engine in operative communication with the quantum computation engine, such that the quantum state engine is configured to store a quantum process to be executed by the quantum computation engine, and store a state of the quantum processing unit.

In another aspect, a method may include receiving a code block from an application quantum environment, and identifying a language of the code block as one of a plurality of programming languages. The method may also include compiling the code block to form a compiled data set, and generating a parsed data structure from the compiled data set. Further, the method may analyze the parsed data structure, convert the parsed data structure into a quantum assembly language structure, process the quantum assembly language structure and output a processed response to an application interface.

The method may further include storing a quantum processing output in a hybrid memory cube storage device.

The code block may be a first code block, and the method may further include receiving a second code block that is bypassed to the processing the quantum assembly language structure step.

The receiving, identifying, and compiling processes may be executed by a quantum compiler engine.

The analyzing and converting processes may be executed by a quantum translator engine.

The processing and outputting processes may be executed by a quantum computation engine.

The quantum competition engine may further include a quantum logic gate interface configured to receive the quantum assembly language structure, as well as a quantum processing unit.

In another aspect, this disclosure includes a quantum computing device that has a processor, and a non-transitory computer-readable medium that includes computer-executable instructions that, when executed by the processor, are configured to receive a code block from an application quantum environment, identify a language of the code block as one of the plurality of programming languages, compile the code block to form a compiled data set, generate a parsed data structure from the compiled data set, analyze the parsed data structure, convert the parsed data structure into a quantum assembly language structure, process the quantum assembly language structure, and output a processed response to an application interface.

The computer-executable instructions, when executed by the processor, are further configured to store a quantum processing output in a hybrid memory cube storage device.

The code block may be a first code block and the computer-executable instructions, when executed by the processor, may be configured to receive a second code block that is bypassed to that process quantum assembly language structure step.

The parsed data structure may further include a syntax tree data structure.

The computer-executable instructions, when executed by the processor may be further configured to analyze the compiled data set for semantic errors and compatible operations that can be executed by the quantum competition engine.

Accordingly, it will be understood that the invention is not to be limited to the embodiments disclosed herein, but is to be understood from the following claims, which are to be interpreted as broadly as allowed under the law.

What is claimed is:

1. A quantum computing device comprising:
   a computation translation engine, comprising:
      a quantum compiler processor configured to:
         receive a code block from an application quantum environment;
         identify a language of the code block as one of a plurality of programming languages;
         compile the code block to form a compiled dataset;
      a syntax processor configured to:
         receive the compiled dataset;
         generate a parsed data structure from the compiled dataset, wherein generating the parsed data structure from the compiled dataset includes breaking down the compiled dataset into a token tree and transmitting the token tree to a quantum translator engine;
      the quantum translator engine configured to:
         analyze the parsed data structure including the token tree;
         convert the parsed data structure into a quantum assembly language structure;
      a quantum computation engine configured to:
         process the quantum assembly language structure; and
         output a processed response to an application interface.

2. The quantum computing device of claim 1, further comprising:
   a hybrid memory cube storage device in operative communication with the quantum computation engine.

3. The quantum computing device of claim 1, further comprising a quantum bus data link between the quantum translator engine and the quantum computation engine.

4. The quantum computing device of claim 3, wherein the code block is a first code block and the quantum compiler processor receives a second code block that bypasses the syntax processor and the quantum translator engine and is received at the quantum bus data link.

5. The quantum computing device of claim 1, wherein the syntax processor is further configured to analyze the compiled dataset for semantic errors and compatible operations that can be executed by the quantum computation engine.

6. The quantum computing device of claim 1, wherein the quantum computation engine further comprises a quantum logic gate interface, configured to receive the quantum assembly language structure, and a quantum processing unit.

7. The quantum computing device of claim 6, further comprising:
   a quantum state engine in operative communication with the quantum computation engine, configured to:
      store a quantum process to be executed by the quantum computation engine; and
      store a state of the quantum processing unit.

8. A method, comprising:
   receiving a code block from an application quantum environment;
   identifying a language of the code block as one of a plurality of programming languages;
   compiling the code block to form a compiled dataset;
   generating a parsed data structure from the compiled dataset, wherein generating the parsed data structure from the compiled dataset includes breaking down the compiled dataset into a token tree and transmitting the token tree to a quantum translator engine;
   analyzing, by the quantum translator engine, the parsed data structure including the token tree;
   converting the parsed data structure into a quantum assembly language structure;
   processing the quantum assembly language structure; and
   outputting a processed response to an application interface.

9. The method of claim 8, further comprising:
   storing a quantum processing output in a hybrid memory cube storage device.

10. The method of claim 8, wherein the code block is a first code block, the method further comprising: receiving a second code block that is bypassed to the processing the quantum assembly language structure.

11. The method of claim 8, wherein the receiving, identifying and compiling are executed by a quantum compiler engine.

12. The method of claim 8, wherein the converting is executed by the quantum translator engine.

13. The method of claim 8, wherein the processing and outputting are executed by a quantum computation engine.

14. The method of claim 13, wherein the quantum computation engine further comprises a quantum logic gate interface configured to receive the quantum assembly language structure, and a quantum processing unit.

15. A quantum computing device, comprising:
   a processor;
   a non-transitory computer-readable medium comprising computer-executable instructions that, when executed by the processor, are configured to:
      receive a code block from an application quantum environment;
      identify a language of the code block as one of a plurality of programming languages;
      compile the code block to form a compiled dataset;
      generate a parsed data structure from the compiled dataset, wherein generating the parsed data structure from the compiled dataset includes breaking down the compiled dataset into a token tree and transmitting the token tree to a quantum translator engine of the quantum computing device;
      analyze the parsed data structure including the token tree;
      convert the parsed data structure into a quantum assembly language structure;
      process the quantum assembly language structure; and
      output a processed response to an application interface.

16. The quantum computing device of claim 15, wherein the computer-executable instructions, when executed by the processor, are further configured to:
   store a quantum processing output in a hybrid memory cube storage device.

17. The quantum computing device of claim 15, wherein the code block is a first code block and wherein the computer-executable instructions, when executed by the processor, are further configured to: receive a second code block that is bypassed to the process quantum assembly language structure.

18. The quantum computing device of claim 15, wherein the computer-executable instructions, when executed by the processor, are further configured to: analyze the compiled dataset for semantic errors and compatible operations that can be executed by a quantum computation engine.

\* \* \* \* \*